United States Patent
Choi et al.

(10) Patent No.: US 10,587,018 B2
(45) Date of Patent: Mar. 10, 2020

(54) BATTERY MODULE INCLUDING HEAT RADIATION PAINT COATING LAYER

(71) Applicant: LG CHEM, LTD., Seoul (KR)

(72) Inventors: Yun-Ki Choi, Daejeon (KR); Jong-Soo Ha, Daejeon (KR); Sang-Il Son, Daejeon (KR); Ha-Neul Yoo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 197 days.

(21) Appl. No.: 15/535,559

(22) PCT Filed: Jan. 28, 2016

(86) PCT No.: PCT/KR2016/000929
§ 371 (c)(1),
(2) Date: Jun. 13, 2017

(87) PCT Pub. No.: WO2016/190521
PCT Pub. Date: Dec. 1, 2016

(65) Prior Publication Data
US 2017/0352933 A1    Dec. 7, 2017

(30) Foreign Application Priority Data

May 26, 2015  (KR) .................. 10-2015-0073148

(51) Int. Cl.
*H01M 10/6551* (2014.01)
*H01M 10/48* (2006.01)
(Continued)

(52) U.S. Cl.
CPC ..... *H01M 10/6551* (2015.04); *H01M 2/1077* (2013.01); *H01M 10/425* (2013.01);
(Continued)

(58) Field of Classification Search
CPC ........ H01M 2/10; H01M 10/42; H01M 10/48; H01M 10/06551; H01M 2/02
See application file for complete search history.

(56) References Cited

U.S. PATENT DOCUMENTS 1,447,782 A * 3/1923 Holland .............. H01M 2/0262
206/524.2
3,375,136 A * 3/1968 Biggar .................. H01M 4/661
429/127
(Continued)

FOREIGN PATENT DOCUMENTS

JP    2002-231192 A    8/2002
JP    2010-57348 A    3/2010
(Continued)

OTHER PUBLICATIONS

International Search Report, issued in PCT/KR2016/000929, dated May 25, 2015.

*Primary Examiner* — Kenneth J Douyette
(74) *Attorney, Agent, or Firm* — Birch, Stewart, Kolasch & Birch, LLP

(57) ABSTRACT

Provided herein is a battery module that is capable of improving cooling efficiency despite a compact structure without using numerous members. The battery module according to the present disclosure includes a battery stack where batteries are stacked; and a battery management system, and includes a heat radiation paint coating layer that includes a heat radiation material in at least a portion of the constituting components.

12 Claims, 4 Drawing Sheets

(51) Int. Cl.
  *H01M 2/10* (2006.01)
  *H01M 10/613* (2014.01)
  *H01M 10/625* (2014.01)
  *H01M 10/647* (2014.01)
  *H01M 10/42* (2006.01)

(52) U.S. Cl.
  CPC ....... *H01M 10/482* (2013.01); *H01M 10/613* (2015.04); *H01M 10/625* (2015.04); *H01M 10/647* (2015.04); *H01M 2010/4271* (2013.01); *H01M 2220/20* (2013.01)

(56) References Cited

U.S. PATENT DOCUMENTS

| | | | |
|---|---|---|---|
| 6,277,516 B1* | 8/2001 | Sasaki | H01M 2/0275 29/623.2 |
| 2008/0086876 A1* | 4/2008 | Douglas | B82Y 10/00 29/846 |
| 2010/0055543 A1 | 3/2010 | Tae et al. | |
| 2010/0285352 A1* | 11/2010 | Juzkow | H01M 2/26 429/163 |
| 2013/0236753 A1 | 9/2013 | Yue et al. | |
| 2014/0234689 A1 | 8/2014 | Kim et al. | |
| 2014/0329138 A1 | 11/2014 | Park et al. | |
| 2015/0194713 A1 | 7/2015 | Jin et al. | |
| 2015/0275061 A1 | 10/2015 | Jeon et al. | |
| 2015/0295283 A1 | 10/2015 | Eom et al. | |
| 2015/0372354 A1* | 12/2015 | Nakano | H01M 2/206 429/90 |
| 2016/0153730 A1 | 6/2016 | Park | |

FOREIGN PATENT DOCUMENTS

| | | | |
|---|---|---|---|
| JP | 2011-210582 A | 10/2011 | |
| JP | 2013-157599 A | 8/2013 | |
| KR | 10-2012-0053476 A | 5/2012 | |
| KR | 10-2013-0011977 A | 1/2013 | |
| KR | 10-2013-0105021 A | 9/2013 | |
| KR | 10-2014-0043031 A | 4/2014 | |
| KR | 10-2014-0099846 A | 8/2014 | |
| KR | 10-1442070 B1 | 9/2014 | |
| KR | 10-2015-0044824 A | 4/2015 | |
| WO | 2014-051295 A1 * | 4/2014 | |
| WO | 2014-122905 A1 * | 8/2014 | |

* cited by examiner (a) (b)

(a) 20' (b)

BATTERY MODULE INCLUDING HEAT RADIATION PAINT COATING LAYER

TECHNICAL FIELD

The present disclosure relates to a battery module, and a battery pack and a device including the same, and more particularly, to a battery module where a configuration that enables prevention of heat accumulation is applied, and a battery pack and a device including the same.

The present application claims priority to Korean Patent Application No. 10-2015-0073148 filed on May 26, 2015, in the Republic of Korea, the disclosure of which is incorporated herein by reference.

BACKGROUND ART

Secondary batteries capable of charging and discharging are being widely used as an energy source of wireless mobile devices. Further, secondary batteries are gathering attention as a power source of electric vehicles (EVs), hybrid electric vehicles (HEVs) and the like that are being presented as a measure to solve air pollution and the like of conventional gasoline vehicles, diesel vehicles and the like that use fossil fuels.

In medium to large scale devices such as vehicles and the like, due to the necessity of high power and massive storage capacity, a battery module where a plurality of batteries are electrically connected and a medium to large scale battery pack including the battery module as a unit module are used. Since it is desirable to prepare such a battery module and a battery pack in as small size and weight as possible, a prismatic battery, a pouch-type battery and the like that may be stacked in high density and high capacity to weight ratio are mainly used as a unit battery of a battery module. Especially, the pouch-type battery that uses an aluminum laminate sheet and the like as its exterior material is gathering attention due to the advantage that it has a small weight and has low manufacturing costs and that it is easy to transform the shape.

Batteries that constitute a battery module generate massive amount of heat in a charging and discharging process. Especially, since the aluminum laminate sheet of the pouch-type battery that is widely used in battery modules and battery packs of high power and massive storage capacity has a surface that is coated with a polymer material having low conductivity, it is to difficult to effectively cool the temperature of the entire battery. Unless the heat of the battery module generated in the charging and discharging process is removed effectively, heat accumulation occurs, which may consequently promote deterioration of the battery module, and in some cases cause ignition or explosion. Therefore, the battery module of high power and massive storage capacity and the battery pack where the battery module is mounted definitely need a means for cooling the batteries embedded therein.

A battery module is generally prepared by a method of stacking a plurality of batteries in high density, and the adjacent batteries are stacked to be spaced apart from one another so as to remove the heat generated during charging and discharging. For example, without using a separate member, the batteries themselves may be sequentially stacked to be spaced apart from one another by a certain distance, or in the case of batteries with low mechanical rigidity, they may be embedded in a cartridge and the like in combinations of one or two or more batteries, and a plurality of such cartridges may be stacked to form the battery module. Between the stacked batteries or battery modules, a passage of a refrigerant such as cooling water may be provided, or a cooling plate (heat sink) or a cooling sheet may be utilized so that the heat being accumulated may be effectively removed.

Most of such conventional means for cooling structures involve cooling heat by interface contact with air such as thermal conduction of an interlayer heat conductor or increase of convection effect and the like by expansion of surface area, and has a problem that the heat release effect significantly deteriorates in a closed space. Especially, devices configured to emit heat such as conventional heat sink and the like use conduction or the convection phenomenon to emit heat, and are generally made of metal material having excellent heat conductivity in order to enhance such effects. However, since a method based on heat transfer is affected by the latent heat of the medium transferring heat and the speed of the heat transfer, there are limitations.

As the capacity increases, due to high integration, an increased amount of heat may be generated, and thus there is a need for a battery module that may be prepared in a simple and compact structure while providing high power and massive storage capacity, and that has excellent life expectancy properties and safety due to a high cooling efficiency.

DISCLOSURE

Technical Problem

The present disclosure is designed to solve the problems of the related art, and therefore the present disclosure is directed to providing a battery module capable of improving the cooling efficiency despite a compact structure without using numerous members.

The present disclosure is also designed to provide a battery pack that includes such a battery module as a unit module and a device that includes such a battery pack.

Technical Solution

The battery module according to the present disclosure includes a battery stack where batteries are stacked; and a battery management system, and includes a heat radiation paint coating layer that includes a heat radiation material in at least a portion of the constituting components.

In one aspect, in the battery stack, electrode leads of the batteries may be connected to each other by a busbar, the battery management system may include a voltage detection unit that includes a relay, and a current sensor that includes a shunt resistance may be further included between the battery stack and the battery management system, and the heat radiation paint coating layer may be included in at least one of the electrode lead, busbar, relay, shunt and constituting components of battery management system.

Especially, it is preferable that the heat radiation paint coating layer is included in a portion of the constituting components having a temperature of 60° C. or above, if there is no heat radiation paint coating layer in the constituting components. The heat radiation paint coating layer may be included in an electrical connection portion of the constituting component. The heat radiation paint coating layer may have a heat radiation rate of 0.9 or above. The heat radiation paint coating layer may be a layer formed by applying a liquid phase paint where the heat radiation material and polymer have been mixed and then being cured in order to radiate, conduct or diffuse the heat of the constituting component.

The heat radiation material may be one or more selected from carbon materials and metal particles. In this case, the carbon material may be one or more selected from graphite, graphene, carbon nano tube and carbon nano fiber, and the metal particle may be one or more selected from a group consisting of aluminum (Al), gold (Au), silver (Ag), copper (Cu), nickel (Ni), tin (Sn), zinc (Zn), tungsten (W) and iron (Fe).

The heat radiation paint coating layer may have a thickness of 0.1 to 300 μm.

In one specific example, the battery may preferably be a plate shape battery so as to provide a high stacking ratio in a limited space, and may be stack-arranged to form a battery stack such that one surface or both surfaces of the battery faces an adjacent battery. Especially, the plate shape battery may be a pouch-type battery of a structure where an outer circumferential surface of a battery case is thermoset and sealed in a state where an electrode assembly is embedded in the battery case of a laminate sheet including a resin layer and a metal layer. In this case, the thermoset outer circumferential surface of the pouch-type battery may be fixed between the cartridges forming the battery stack by fixing each of the batteries.

Specifically, the plate shape battery is a pouch-type battery where the electrode assembly consisting of a positive electrode plate, a separator and a negative electrode plate is sealed inside the battery case together with electrolyte, and may be configured in an overall plate form of a generally rectangular parallelepiped structure with a high width to thickness ratio. Such a pouch-type battery is generally configured in a pouch-type battery case, and the battery case consists of a laminate sheet structure where an external coating layer made of polymer resin having excellent durability, a blocking layer made of a metal material that exerts blocking capabilities against moisture, air and the like, and an internal sealant layer made of a polymer resin that may be thermoset may be sequentially laminated. In the pouch-type battery, the battery case may be made in various structures.

There is no particular limitation to the battery as long as it is a secondary battery that may provide high voltage and high current when constituting a battery module and a battery pack, for example, a lithium secondary battery having a large energy storage capacity per volume.

The present disclosure also provides a battery pack including the battery module as a unit module.

The battery pack may be prepared by combining the battery modules as unit modules according to desired output and capacity, and considering mounting efficiency, structural stability and the like, the battery pack may be preferably used as a power source of electric vehicles, hybrid electric vehicles, plug-in hybrid electric vehicles, electric storage apparatuses and the like, but the application scope is not limited thereto.

Therefore, the present disclosure may provide a device including the battery pack as a power source, and the device may be, particularly, an electric vehicle, a hybrid electric vehicle, a plug-in hybrid electric vehicle or an electric storage apparatus.

Because such device constitution and manufacturing method thereof are well known in the art, redundant explanations thereof will not be provided in the present disclosure.

Advantageous Effects

According to the present disclosure, the cooling performance may be easily improved by applying heat radiation paint to a desired portion in the form of a coating layer without structural changes of a conventional battery module cooling system. As the cooling by radiation efficiently cools the components constituting the battery module, the components of the battery module are prevented from being heated to a high temperature due to excessive current flowing in the battery, high temperatures of outside air, overcharging and the like, thereby preventing phenomena such as deterioration of battery performance and explosion.

Further, a heat radiation paint has great insulation effects, thereby providing an added effect of increasing insulation inside the battery module. The present disclosure provides an effect of reducing the temperature through heat radiation, thereby preventing high heat accumulation of a battery module, improving the overall cooling performance of the battery module, and extending the performance and life expectancy of the battery.

BEST MODE

Figure 1:
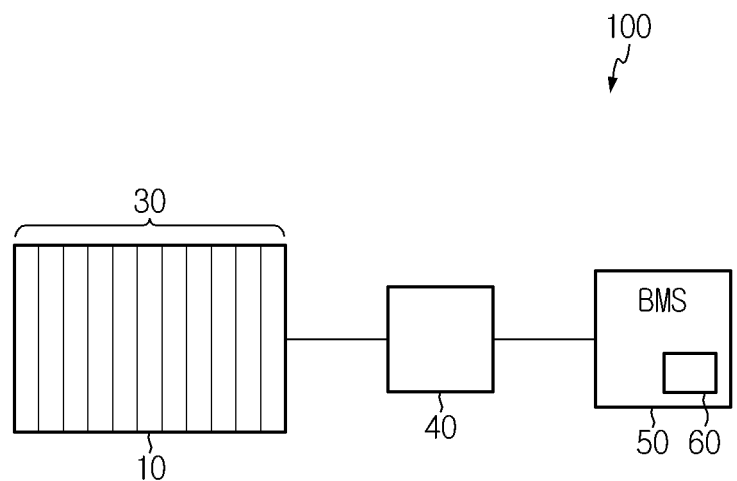
FIG. 1 is a view schematically illustrating a battery module according to the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments disclosed in the present specification and the configurations illustrated in the drawings are merely the most preferred embodiments of the present disclosure, and not all of them represent the technical ideas of the present disclosure, and thus it should be understood that there may be various equivalents and modified examples that could substitute therefor at the time of filing the present application.

FIG. 1 is a view schematically illustrating a battery module according to the present disclosure.

Referring to FIG. 1 the battery module 100 according to the present disclosure includes a battery stack 30, a current sensor 40, a battery management system (BMS) 50 and the like.

The battery stack 30 is where batteries 10 are stacked. The battery 10 is preferably a plate shape battery so as to provide a high stacking ratio in a limited space, and may be stack-arranged to form a battery stack 30 such that one surface or both surfaces of the battery 10 faces an adjacent battery 10.

The battery 10 includes an electrode assembly consisting of a positive electrode plate, a separator and a negative electrode plate, and it may be a battery where a positive electrode lead and a negative electrode lead are electrically connected respectively to a plurality of positive electrode tabs and negative electrode tabs protruding from the positive electrode plate and the negative electrode plate of each battery 10.

Aluminum is mostly used as the material of the positive electrode plate. Alternatively, stainless steel, nickel, titan or aluminum, or stainless steel surface-treated with carbon, nickel, titan, silver and the like may be used as the material of the positive electrode plate. Further, there is no limitation to the material of the positive electrode plate as long as it does not cause chemical changes in the secondary battery and has high conductivity.

Some areas of the positive electrode plate may be provided with a positive electrode tab which may be made in the form extended from the positive electrode plate. Alternatively, a conductive member may be configured in the form of being coupled to a certain portion of the positive electrode plate through welding and the like. Further, a positive electrode material may be applied to some areas of an outer circumferential surface of the positive electrode plate and then dried to form a positive electrode tab.

For the negative electrode plate corresponding to the positive electrode plate, copper material is mostly used. Alternatively, as the material of the negative electrode plate, stainless steel, aluminum, nickel, titan, copper, or stainless steel surface-treated with carbon, nickel, titan, silver and the like, and aluminum-cadmium alloy and the like may be used.

The negative electrode plate also has a negative electrode tab in some areas thereof, and just as the positive electrode tab explained above, the negative electrode plate may not only be configured in the form extended from the negative electrode plate, but a member made of a conductive material may also be coupled to a certain portion of the negative electrode plate in a method such as welding and the like, and a negative electrode material may be formed in the method of being applied to some areas of an outer circumferential surface of the negative electrode plate and dried, and the like.

The positive electrode lead is electrically connected to the positive electrode tab provided in the positive electrode plate, and the negative electrode lead is electrically connected to the negative electrode tab provided in the negative electrode plate. Preferably, the positive electrode lead and the negative electrode lead are coupled to a plurality of positive electrode tabs and a plurality of negative electrode tabs, respectively.

The positive electrode plate and the negative electrode plate are coated with a positive electrode active material and a negative electrode active material, respectively. For example, the positive electrode active material is a lithium-based active material, and a representative example to be used may be a metal oxide such as $LiCoO_2$, $LiNiO_2$, $LiMnO_2$, $LiMn_2O_4$, $LiFePO_4$ or $Li_{1+z}Ni_{1-x-y}Co_xM_yO_2$ ($0 \leq x \leq 1$, $0 \leq y \leq 1$, $0 \leq x+y \leq 1$, $0 \leq z \leq 1$, and M being a metal such as Al, Sr, Mg, La, Mn and the like). The negative electrode active material may be a carbon-based active material, and as the negative electrode active material, a carbon material such as crystalline carbon, amorphous carbon, carbon composite, carbon fiber and the like, a lithium metal, a lithium alloy and the like may be used. The types and chemical compositions of the positive electrode active material and the negative electrode active material may vary without limitation depending on the type of the secondary battery, and thus it should be understood that the specific examples listed above are just provided as examples.

There is no limitation to the material of the separator as long as it is a porous material. The separator may be made of a porous polymer film, for example, porous polyolefin film, polyvinylidene fluoride-hexafluoro propylene, polyvinylidene fluoride-trichloroethylene, polymethylmethacrylate, polyacrylonitrile, polyvinylpyrollidone, polyvinylacetate, ethylene vinyl acetate copolymer, polyethyleneoxide, cellulose acetate, cellulose acetate butylate, cellulose acetate propionate, cyanoethylflurane, cyanoethylpolyvinylalcohol, cyanoethylcellulose, cyanoethylsucrose, flurane, carboxyl methyl cellulose, acrylonitrilestyrenebutadine copolymer, polyimide, polyethyleneterephthalate, polybutyleneterephthalate, polyester, polyacetal, polyamide, polyetheretherketone, polyethersulfone, polypenyleneoxide, polypenylenesulfide, polyethylenenaphthalate, non-woven fabric, film having a porous web structure, a combination thereof or the like. On one surface or both surfaces of the separator, inorganic particles may be attached.

The inorganic particles may preferably be inorganic particles having a high dielectric constant of 5 or above, and more preferably, inorganic particles having a high dielectric constant of 10 or above and a low density. This is because such inorganic particles can easily transmit the lithium ions moving within a battery. Non-limiting examples of the inorganic particle having a high dielectric constant of 5 or above include $Pb(Zr,Ti)O_3(PZT)$, $Pb_{1-x}La_xZr_{1-y}Ti_yO_3$ (PLZT), $Pb(Mg_3Nb_{2/3})O_3$—$PbTiO_3$(PMN-PT), $BaTiO_3$, $HfO_2$, $SrTiO_3$, $TiO_2$, $Al_2O_3$, $ZrO_2$, $SnO_2$, $CeO_2$, $MgO$, $CaO$, $ZnO$, $Y_2O_3$, a combination thereof or the like.

The battery stack 30 may have a structure where the plurality of batteries 10 are simply stacked while interposing an insulation film between the batteries 10. In another example, the battery stack 30 may have a stack folding structure formed by arranging the batteries 10 at appropriate intervals on an upper and/or lower portion of an insulation film, and then folding the insulation film in one direction together with the batteries 10 so that the batteries 10 are inserted between every folded insulation film. In yet another example, the battery stack 30 may be a pouch-type battery assembly.

Figure 2:
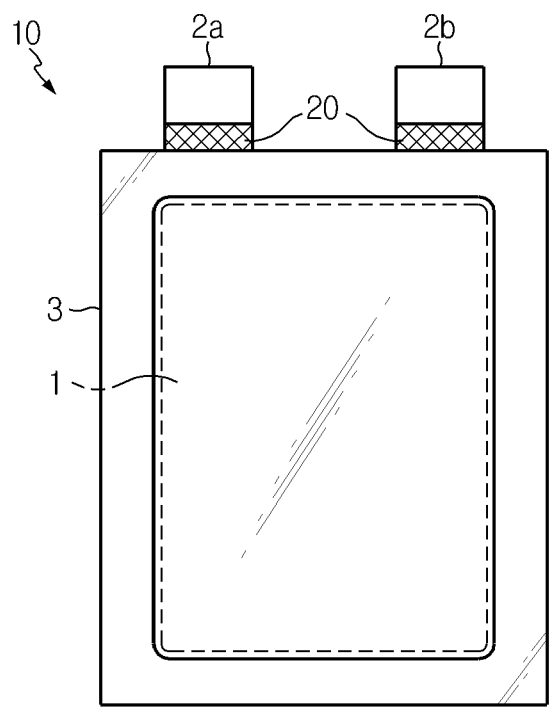
FIG. 2 is a view schematically illustrating a case where a battery is a pouch-type battery in the battery module according to the present disclosure.

FIG. 2 is a schematic view of a case where the battery 10 is a pouch-type battery. As illustrated in FIG. 2, the pouch-type battery 10 consists of an electrode assembly 1 such as that explained above, and a pouch-type battery case 3 configured to accommodate the electrode assembly 1. The pouch-type battery 10 is configured in an overall plate form of a generally rectangular parallelepiped structure with a high width to thickness ratio.

The pouch-type battery case 3 includes an upper pouch and a lower pouch, and after the electrode assembly 1 is accommodated in a space formed by the upper pouch and the lower pouch, a sealing part formed on an outer circumferential surface of the upper pouch and a sealing part formed on an outer circumferential surface of the lower pouch are attached to each other. In the case of coupling the electrode assembly 1 and the pouch-type battery case 3 with each other, for an electrical connection with an external terminal or an apparatus and the like, the electrode assembly 1 and the pouch-type battery case 3 are coupled such that some portions of the positive electrode lead 2a and the negative electrode lead 2b are exposed. The pouch-type battery case 3 protects the electrode assembly 1 and a battery portion made of the electrolyte being introduced inside by a subsequent process, and is configured in the form where an aluminum thin film is interposed in order to improve the properties supplementary to the electrochemical properties of the battery and the heat release properties and the like, and in order to secure insulation against the battery and the outside, an insulating layer coated with an insulating material such as polyethylene terephthalate (PET) resin or nylon resin and the like is formed outside the aluminum thin film. More specifically, the pouch-type battery case 3 is configured in a laminate sheet structure where an external coating layer made of polymer resin having excellent durability, a blocking layer made of a metal material that exerts blocking capabilities against moisture, air and the like, and an internal sealant layer made of a polymer resin that may be thermoset may be sequentially laminated.

The side of the pouch-type battery case 3 from which the positive lead 2a and the negative lead 2b protrude is a terrace. The battery 10 may have a high competitiveness through the battery stack 30 structure having various forms of electrical series/parallel connection within the battery module. The thermoset outer circumferential surface of the pouch-type battery may 10 be fixed between the cartridges forming the battery stack 30 by fixing each of the batteries 10. Here, the electrical connection of the batteries 10 is enabled as each positive electrode lead 2a and positive electrode lead 2b of the batteries are welded to a busbar.

Referring to FIG. 1 again, the battery management system 50 is a BMS well known in fields using secondary batteries, and may include one master battery management system and a plurality of slave battery management systems. The current sensor 40 measures the amount of current flowing through the battery stack 30, and transmits the measurement to the battery management system 50. For example, the current sensor 40 may be a Hall current transformer (Hall CT) configured to measure the current using a Hall device and output an analogue current signal corresponding to the measured current, or a shunt resistor configured to connect a resistor to a connection where the current of the battery flows and generate a voltage signal corresponding to the current of the battery. The battery management system 50 may include a voltage detection unit 60. The voltage detection unit 60 may include a relay.

Of such components of the battery module 100, the present disclosure especially includes a heat radiation paint coating layer including a heat radiation material in the electrical connection portion, and more particularly, in the present embodiment, the heat radiation paint coating layer is included in at least one of the positive electrode lead 2a and the negative electrode lead 2b inside the battery 10, the busbar connecting the positive electrode lead 2a and the negative lead 2b of various batteries 10, a shunt included in the current sensor 40, the relay included in the voltage detection unit 60, and other components and the like constituting the battery management system 50.

FIG. 2 illustrates a representative example of the heat radiation paint coating layer 20 included in the positive electrode lead 2a and the negative electrode lead 2b. Since it is preferable that the heat radiation paint coating layer 20 has insulation properties, it should not be formed in a portion of the positive electrode lead 2a and the negative electrode lead 2b, that needs to be electrically connected with another component.

The heat radiation paint coating layer of the present disclosure is not applied to only the components listed above, but it may be applied to at least one of various circuit components constituting the electrical connection and the electric circuit components constituting the battery module, and especially, if there is no heat radiation paint coating layer, it is preferably applied to a portion where the temperature is 60° C. or above, that is, to a heat generating portion. The heat radiation paint coating layer may be applied to any area of the components constituting the battery module, but it has good temperature reduction effect relative to process or cost when applied to a portion having the temperature of 60° C. or above.

It is preferable that the heat radiation paint coating layer has a heat radiation rate of 0.9 or above. The heat radiation rate needs only to be greater than 0, but in order to expect an adequate temperature reduction effect, the heat radiation rate should be 0.5 or above, and preferably, 0.9 or above. The heat radiation paint coating layer may be a layer formed by applying a liquid phase paint where a heat radiation material and a polymer have been mixed, and then curing the applied paint, in order to radiate, conduct or diffuse the heat of the components.

The heat radiation material may be one or more selected from carbon materials and metal particles. In such a case, the carbon material may be one or more selected from graphite, graphene, carbon nano tube and carbon nano fiber, and the metal particle may be one or more selected from a group consisting of aluminum (Al), gold (Au), silver (Ag), copper (Cu), nickel (Ni), tin (Sn), zinc (Zn), tungsten (W) and iron (Fe). The heat radiation paint coating layer may have a thickness of 0.1 to 300 μm.

The present disclosure incorporates the heat radiation paint coating layer of a high heat radiation rate (0.9 or above) in a portion being exposed to high temperatures (60° C. or above) of such components of the battery module, especially the electrical connection portion, thereby reduces the temperature by cooling by radiation.

The heat radiation paint is a material in the form of a liquid phase paint where a heat radiation material has been mixed in order to radiate, conduct or diffuse the heat in the heat radiation portion using polymer such as thermosetting liquid phase resin. A heat radiation paint prepared such that it includes the carbon material and metal particles mentioned above and then applied to form a coating layer exhibits excellent horizontal and vertical heat radiation effects due to its high heat diffusion properties. Further, other ingredients may be further included to prepare a heat radiation paint having excellent chemical resistance and excellent adhesion to a subject matter for adhesion.

For example, the heat radiation paint coating layer included in the battery module according to the present disclosure may be provided by applying a heat radiation paint prepared through the following preparation method on top of the components of the battery module and then forming the layer.

Conventional heat radiation paint preparation methods may be used as the preparation method of the heat radiation paint, and the ingredients or specific preparation conditions of the heat radiation paint may be changed by one skilled in the related art if necessary.

A preparation method for a heat radiation paint, especially, for a preferable insulating heat radiation paint may include the following steps:

a) preparing a raw material that includes polymer and heat radiation material; and b) adding and stirring a curing agent, a leveling agent, a pigment, a solvent, a release agent, a filling agent and the like in consideration of painting properties (surface strength, acid resistance, weather resistance and the like) and adhesiveness.

Such a heat radiation paint is applied to at least some of the components of the battery module according to the present disclosure to form a coating layer. The coating method may be a spray method or a comma coating method, and the heat radiation paint coating layer may be formed such that its thickness is 0.1 to 300 µm. When the thickness of the heat radiation paint coating layer is less than 0.1 µm, the effects of durability and the like provided by coating the heat radiation paint coating layer may be small. Further, when the thickness of the heat radiation paint coating layer exceeds 300 µm, the curing may take a long time, and it may be difficult to prepare the heat radiation paint coating layer at a low price. Further, considering the durability, price and the like, it is more preferable that the heat radiation paint coating layer has a thickness of 10 to 30 µm.

Of course, the heat radiation paint coating layer may be coated in various printing methods such as by brush, intaglio printing, roller, silk screen, stamping, inkjet and the like, or other methods such as constant discharging, spindle coating, impregnation and the like. Besides the direct coating method by the methods mentioned above, sheets or tapes may be developed as products depending on the place of application and method of application of the products.

At step a), the polymer may be a type of resin such as enamel or urethane, or rubber such as SBR, EPDM and the like. The polymer serves as a binder configured to grant adhesion and flexibility. However, the polymer is not limited to the aforementioned, but it may be transformed and modified according to the characteristics of the product to which it is to be applied.

At step a), the heat radiation material may be one or more selected from carbon material and metal particles. The final heat radiation rate may vary depending on the type, ratio of ingredients, and purity of the heat radiation material.

The carbon material may be one or more selected from graphite, graphene, carbon nano tube and carbon nano fiber. There is no particular limitation to such a carbon material, but one that has a particle size (diameter or length) of 200 µm or below, or more particularly, 0.1 nm (nanometer) to 200 µm may be used. Such a carbon material connects between the subject matter of adhesion and a surface of the heat radiation paint coating layer, thereby enhancing the heat transfer effect, and also serves to increase the surface area of heat transfer as the surface roughness is increased together with the formation of the heat radiation paint coating layer. Especially, the carbon nano tube having low specific gravity is placed inside the heat radiation paint coating layer, thereby providing the tube properties of enhancing absorptiveness of heat quantity.

The metal particle may be one or more selected from a group consisting of aluminum (Al), gold (Au), silver (Ag), copper (Cu), nickel (Ni), tin (Sn), zinc (Zn), tungsten (W) and iron (Fe). There is no particular limitation to such a metal particle, but one that has a particle size (diameter) of 200 µm or below, or more particularly, 0.1 nm (nanometer) to 200 µm may be used. The metal particle also serves to connect the subject matter of adhesion and the surface of the heat radiation paint coating layer, thereby improving the heat transfer effect.

The heat radiation paint must quickly absorb the heat generated from the components constituting the battery module and quickly discharge the heat to outside, so that heat accumulation does not occur. That is, the heat radiation paint must have good heat radiation efficiency to outside as well as good heat conductivity and heat diffusion. Metal generally has a property of trying to keep heat even if it is a metal having excellent heat conductivity. Accordingly, when metal is heated, at first the heat is quickly transferred and evenly spread until it passes a limitation, where the heat of the metal itself starts to rise. That is, no matter how excellent the heat conductivity of the metal is, after a certain time, the heat radiation efficiency to outside falls due to the aforementioned reason.

Comparing aluminum and copper for example, copper has greater heat conductivity than aluminum. Here, when using only copper for heat radiation, since copper has a high heat conductivity, it may quickly absorb heat from the components of the battery module. However, since copper has a great property of trying to keep heat, its heat radiation efficiency (heat transfer effect) to outside is lower than that of aluminum. Further, to the opposite of copper, aluminum has good heat radiation efficiency to outside, but its heat absorption ability from the components of the battery module is lower than that of copper.

Therefore, in order to maximize heat radiation, it is preferable to use a combination of two or more different kinds of metal, for example, aluminum and copper, as the metal particle, so that the heat conductivity (heat absorption ability from the components of the battery module) and the heat radiation efficiency (heat transfer effect) to outside may be mutually supplemented, thereby providing excellent heat radiation.

As a heat radiation material, an inorganic material ingredient having a resistance of $1 \times 10^{12}$ Ohm or above, a heat conductivity of 50 W/m·K or above, and a powder particle size of 30 µm on or less may be further included as powder having insulation and heat conductivity. Possible examples are boron nitride, aluminum silicate or aluminumoxide, silica and the like. Silica is a material of low specific gravity and porosity, that is mainly placed on a surface of the heat radiation paint coating layer to increase the surface area of heat transfer. Aluminum silicate serves to increase the corrosive resistance, hardness and surface area of heat transfer of coating.

At step b), the thickness of formation of the coating layer may be adjusted by changing the state of the heat radiation material and polymer using various solvents or water. If the content of the solvent is too small, the viscosity may rise, thereby deteriorating the coating operability, and if the content of the solvent is too much, it may take too much time for curing (drying), which is not preferable. The solvent may be an organic solvent such as toluene or xylene and a hydrocarbon having polarity. Depending on the ratio of the solvent and the ratio of the composition, physical properties may differ. The thickness and heat radiation rate may be adjusted by adjusting the ratio of the solvent according to process characteristics of the user.

Besides the aforementioned, various additives may be used to adjust the extent of physical properties maintaining the physical strength after curing, and heat radiation, conduction or diffusion properties required by industries when coated on a subject matter. Other ingredients besides the heat radiation material are not limited to the aforementioned, but may be transformed and modified according to characteristics of a product to be applied.

A general heat conductive paint exhibits an average heat conductivity of 0.87 W/m·K, but the heat radiation paint such as that explained above may have a heat conductivity of 5 W/m·K or above, and thus the heat radiation rate may be 0.2 or above, and depending on the configuration of the heat radiation material, the heat radiation paint may be prepared to have a heat radiation rate of 0.5 or above, and preferably, 0.9 or above, thereby maximizing the cooling effect.

Further, the heat radiation paint such as that explained above may solve the waterproof, electrical insulation, corrosion resistance and heat radiation effect all at the same time, and adding particles having insulation as filler agents provides effects of having more excellent insulation and heat radiation properties. With the high heat diffusion properties, effects of excellent horizontal and vertical heat radiation effect are provided. Excellent chemical resistance and an effect of excellent adhesion to a subject matter for adhesion are provided.

The heat radiation paint coating layer may be formed in each component of the battery module 100, and the components may be assembled to constitute the battery module 100. Instead, it is also possible to complete assembling the battery module 100 first and then forming the heat radiation paint coating layer on the electrical connection portion. For the former case, a coating method such as direct application will be convenient, and for the latter case, application with tape will be convenient.

Figure 3:
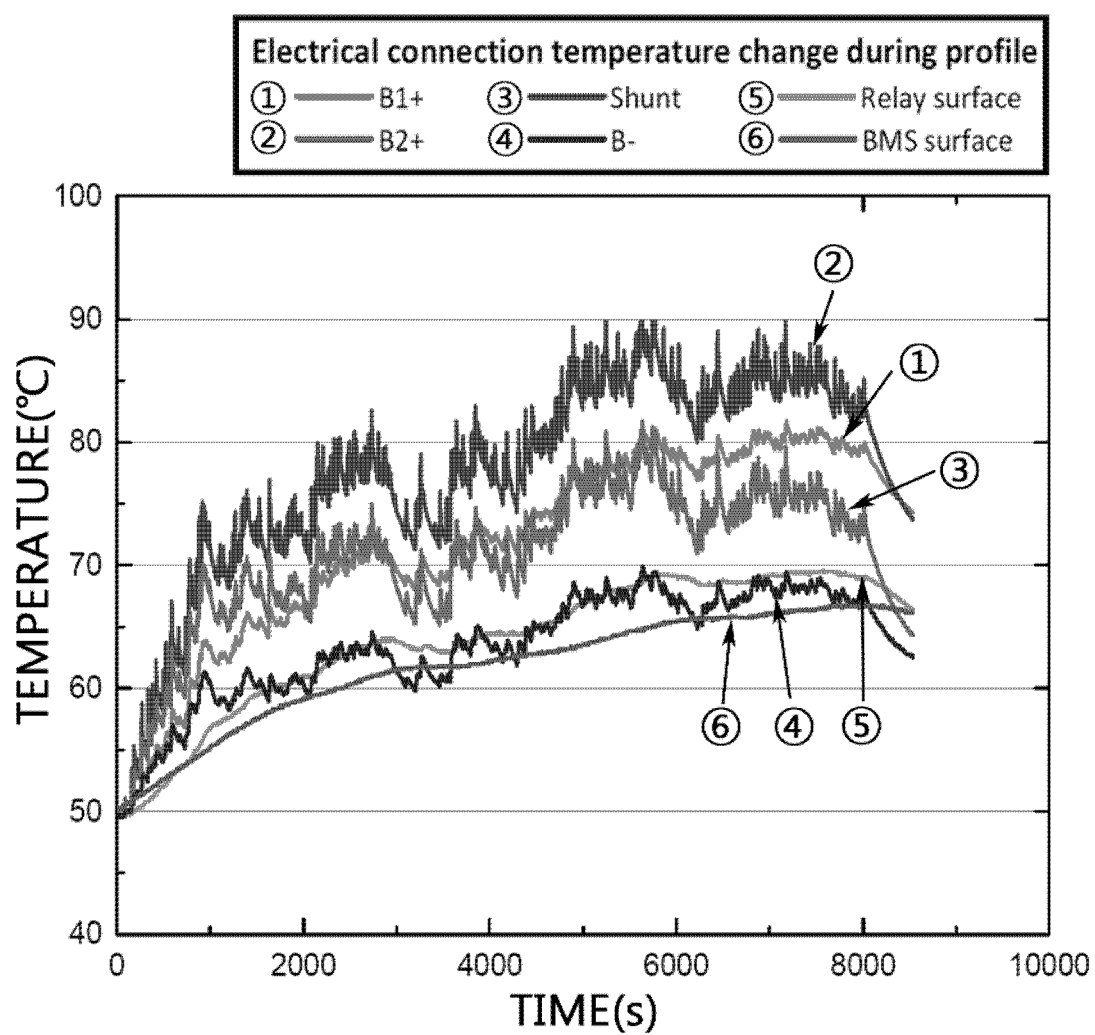
FIG. 3 is a graph of temperatures of an electrical connection portion measured over time in a conventional battery module where the heat radiation paint as that of the present disclosure has not been applied.

FIG. 3 is a graph of temperatures of an electrical connection portion measured over time in a conventional battery module where the heat radiation paint as that of the present disclosure has not been applied. FIG. 3 illustrates changes of temperatures of an input positive electrode busbar (B1+), a shunt, a relay surface, an output positive electrode busbar (B2+), a negative electrode busbar (B−), and a BMS surface over time.

Although there are differences depending on the profiles, as shown in FIG. 3, the temperatures of electrical connections inside the battery module easily rise to 60° C. or above, which affects the durability and reliability of the electrical connection itself. Moreover, this may raise the temperature inside the battery module, leading to a temperature rise of the battery, causing performance degradation and deterioration and the like of the entire battery.

Figure 4:
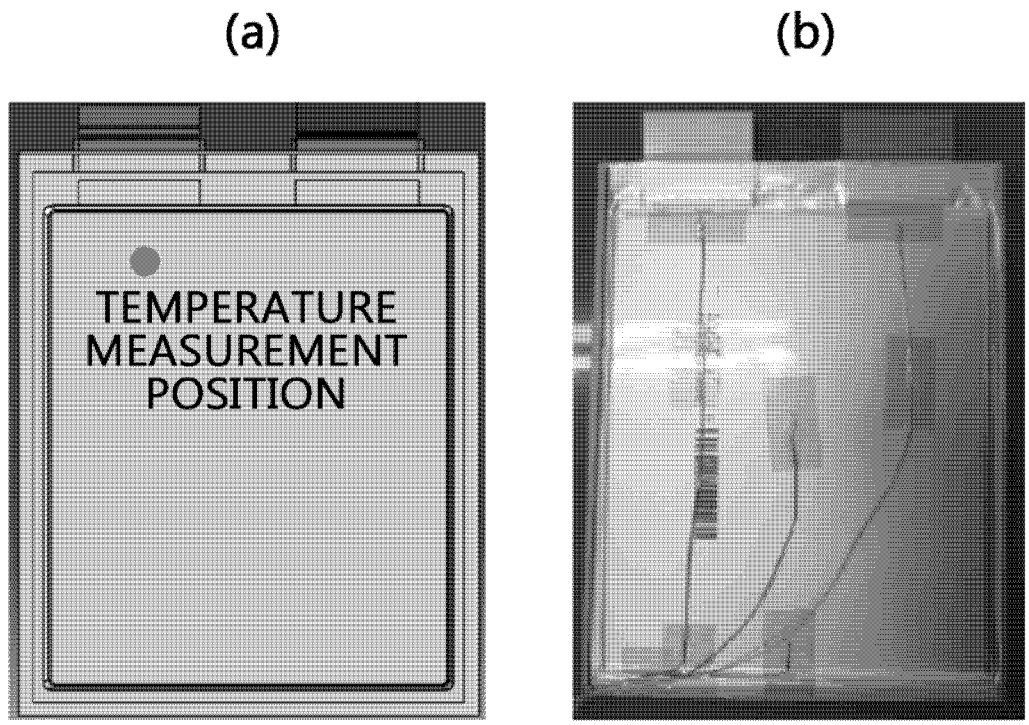
FIG. 4 and FIG. 5 are schematic views and photos of experiment examples provided to compare the temperatures between a conventional battery and the battery according to the present disclosure.
Figure 5:
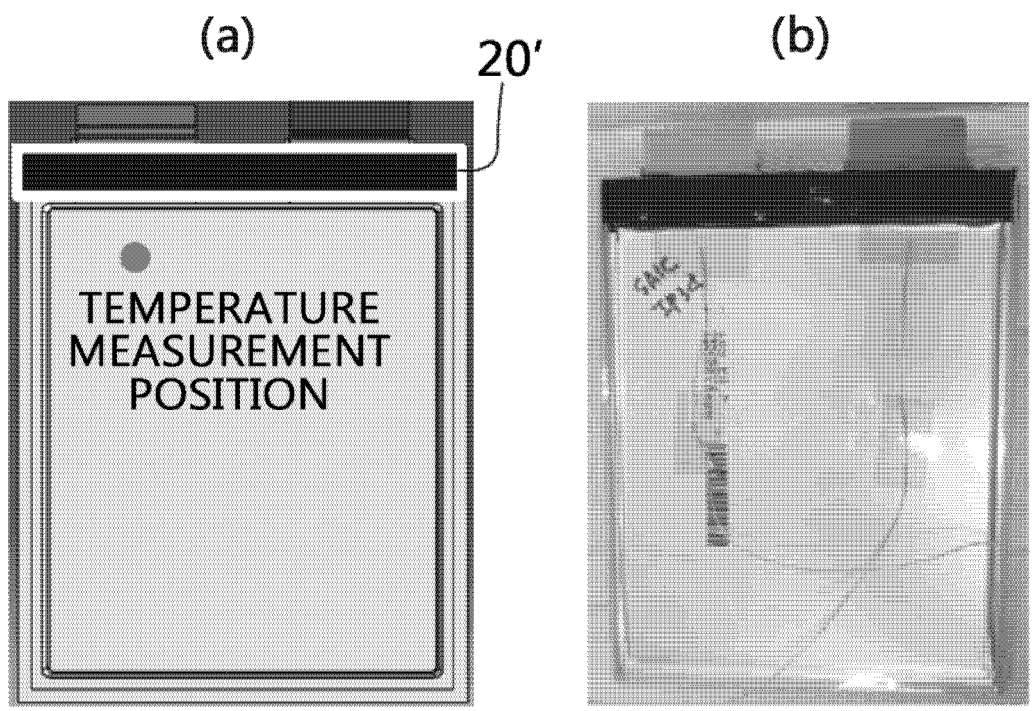

FIG. 4 and FIG. 5 are schematic views and photos of experiment examples provided to compare the temperatures between a conventional battery and the battery according to the present disclosure.

FIG. 4 is a conventional battery, and FIG. 5 is a battery including the heat radiation paint coating layer according to the present disclosure. In the battery of FIG. 5, the heat radiation paint was applied to the terrace so that the battery includes the heat radiation paint coating layer 20'. In FIG. 4 and FIG. 5, (a) is a schematic view showing the position of measurement, and (b) is a photo of the battery actually used in the measurement.

Figure 6:
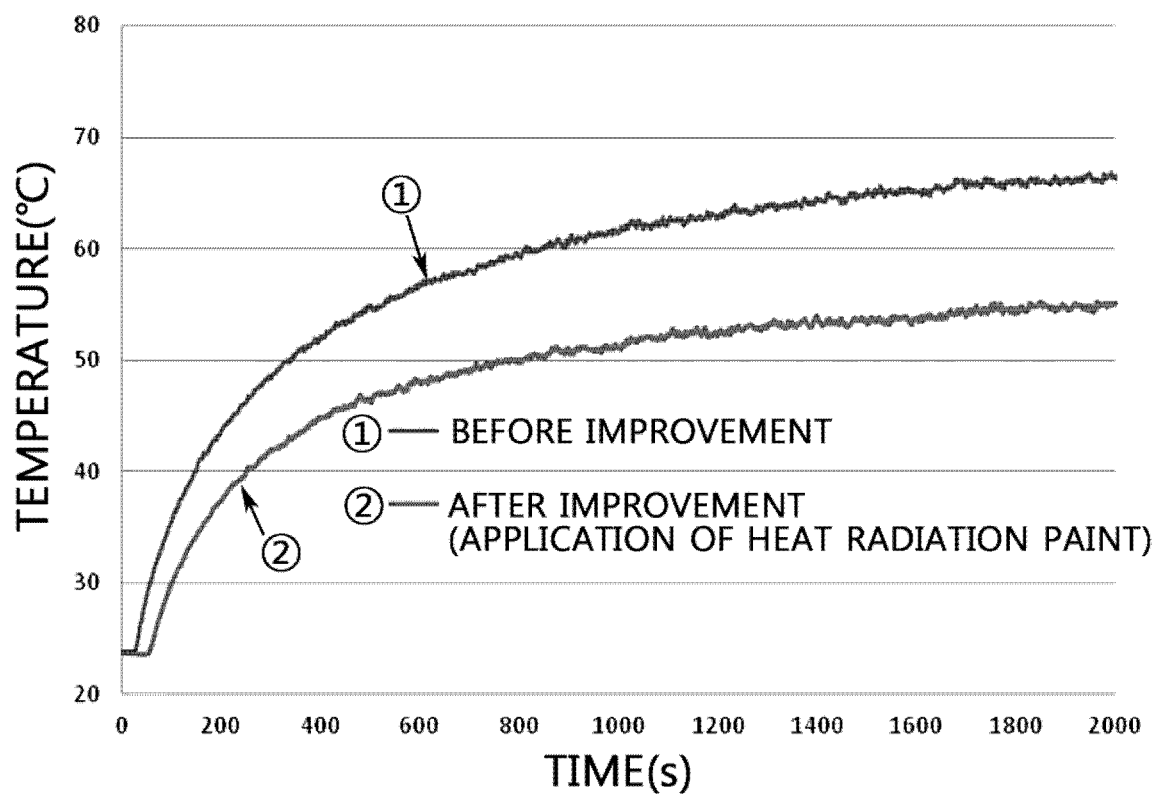
FIG. 6 shows results of comparison between the temperatures of the batteries of FIG. 4 and FIG. 5 measured over time.

FIG. 6 shows the temperatures of the batteries of FIG. 4 and FIG. 5 measured over time and a result of comparing the same.

Experiment condition: a current of 200 A RMS is applied at SOC 50%, 25° C.

Experiment result: it can be seen that when the heat radiation paint was applied to the terrace (after improvement), the temperature was lower by 15° C. or more than when the heat radiation paint was not applied (before improvement). Therefore, as the temperature of the battery module including such a battery is reduced by about 15° C. One can expect that there is a heat reduction effect caused by heat radiation in the battery module that includes the heat radiation paint coating layer according to the present disclosure.

As shown in FIG. 6, the case of the present disclosure applying the heat radiation paint coating layer that includes the heat radiation material exhibits excellent heat radiation effects due to the heat radiation efficiency from radiation energy, thereby reducing overall the battery temperature. As the heat radiation paint coating layer is included, the temperature of the electrical connection portion is reduced by 15° C. at the minimum. The effects may differ depending on the experiment conditions (since the heat radiation effect is great, the higher the temperature of the target subject, the greater the effect of increase of heat radiation), but it can be seen that applying the heat radiation paint to only the terrace portion in battery units also has effects. When the heat radiation paint is applied to the electrode lead and other electrical connection portions in units of battery module, the temperature reduction effect will be more distinctive.

Of the various methods for releasing the heat generated in a secondary battery, removing the heat was done by conduction and the convection principle, and heat cooling by radiation was not seriously considered in the past. Since the present disclosure uses cooling by radiation, there is no need for an additional component for transferring heat by conduction and convection.

Of electrical components, the temperature of an electrical connection where electricity flows directly, for example, an electrode tab, an electrode lead, a busbar, a shunt, a relay, a BMS and the like may rise to 80° C. or above, and thus it is necessary to lower the temperature to an appropriate temperature. In the past, cooling used to be concentrated on large areas of the battery, but the present disclosure proposed cooling concentrated on the electrical connection portion where heat generation is especially severe.

According to the present disclosure, cooling performance may be easily improved by applying the heat radiation paint in the form of a coating layer to a necessary portion without structural changes of a conventional battery module cooling system. The battery module may be prepared in a simple and compact structure while providing electric power of high output and massive storage capacity, and also excellent life expectancy and safety based on high cooling efficiency. Such a battery module constitutes a battery pack, and the battery pack is mounted onto a device that uses the battery pack, to realize excellent battery performance.

The present disclosure has been described in detail. However, it should be understood that the detailed description and specific examples, while indicating preferred embodiments of the disclosure, are given by way of illustration only, and various changes and modifications within the scope of the disclosure will become apparent to those skilled in the art from this detailed description.

What is claimed is:

1. A battery module comprising:
   a battery stack where batteries are stacked; and
   a battery management system,
   wherein, in the battery stack, electrode leads of the batteries are connected to each other via a busbar, the battery management system includes a voltage detection unit that includes a relay, a current sensor that includes a shunt resistance is further included between the battery stack and the battery management system, and a heat radiation paint coating layer is included in an electrical connection portion of at least one of the busbar, relay, shunt and constituting components of battery management system,
   wherein the heat radiation paint coating layer includes a heat radiation material comprising a carbon material and metal particles, and wherein the heat radiation paint coating layer is a layer formed by applying a liquid phase paint where the heat radiation material and polymer have been mixed and then being cured in order to reduce the temperature by cooling by radiation.

2. The battery module according to claim 1, wherein the heat radiation paint coating layer is included in a portion of the constituting components having a temperature of 60° C. or above.

3. The battery module according to claim 1, wherein the heat radiation paint coating layer has a heat radiation rate of 0.9 or above.

4. The battery module according to claim 1, wherein the carbon material is one or more selected from graphite, graphene, carbon nano tube and carbon nano fiber.

5. The battery module according to claim 1, wherein the metal particles are one or more selected from a group consisting of aluminum, gold, silver, copper, nickel, tin, zinc, tungsten and iron.

6. The battery module according to claim 1, wherein the heat radiation paint coating layer has a thickness of 0.1 to 300 μm.

7. The battery module according to claim 1, wherein the heat radiation paint coating layer is applied in a method of directly coating a heat radiation paint, or by sheet or tape on top of the constituting component.

8. The battery module according to claim 1, wherein as the heat radiation paint coating layer is included, the temperature of the electrical connection portion is reduced by 15° C. at the minimum.

9. The battery module according to claim 1, wherein the battery is a plate shape battery, and is stack-arranged such that one surface or both surfaces of the battery face an adjacent battery to form the battery stack.

10. The battery module according to claim 9, wherein the plate shape battery is a pouch-type battery of a structure where an outer circumferential surface of a battery case is thermoset and sealed in a state where an electrode assembly is embedded in the battery case of a laminate sheet including a resin layer and a metal layer, and the thermoset outer circumferential surface of the pouch-type battery may be fixed between cartridges forming the battery stack by fixing each of the batteries.

11. A battery pack comprising a battery module according to claim 1 as a unit module.

12. A device that is one of an electric vehicle, a hybrid electric vehicle, a plug-in hybrid electric vehicle, and an electric storage apparatus that includes the battery pack according to claim 11.

* * * * *